(12) United States Patent
Pitkin

(10) Patent No.: X5307
(45) Date of Patent: Dec. 13, 1828

(54) FENCING,REPAIRING

(76) Inventor: Edward Pitkin

Edward Pitkin
Letters Patent

The Schedule referred to in these Letters Patent and making part of the same con-
taining a description in the words of the said Edward Pitkin himself of his
improvement in the mode of repairing fences This improvement consists in backing or splicing the Posts, when the bot-
toms are rotted off. A quarter of a round cut of any tree that is suit-
able for posts and about seven feet long is sawed in a slanting direction
half across about 2 1/2 feet from one end and on the opposite side the same
distance from the other end, and then split apart from one sawing to the oth-
er making two back pieces with a cut to stand in the ground.

In case such timber is used as will not split, it may be sawed or
hewed into a square shape of about six inches diameter, and sawed diag-
onally from about 2 ft. of one end to about 2 ft. of the other end.

To repair a post when rotted off at the bottom, the post is raised
up and kept in its place at the height wanted. The backing piece set
in the ground so as that the shoulder will be a little out of the ground,
and then fastened to the back of the post by two or more spikes (cut
ones preferred). When a five hole post is rotted off so as to destroy the
bottom hole, the centre of the post may be cut out up to the next hole
and a backing piece cut off and slanted so as to fit in the end coming
up so as to form a button hole and a spike driven thro' the sound
part of the post on each side, making in this way a four holed post.
Posts to fences of all descriptions may be repaired in this way.

East Hartford Nov 12th 1828.

Witnesses

Edward Pitkin

Exd.
MG.

(336 words)

(Patented 13. December 1828.)

United States Patent
Patent No.: X5307
5307X
E. Pitkin,
Fence Post,
Patented Dec. 13, 1828.
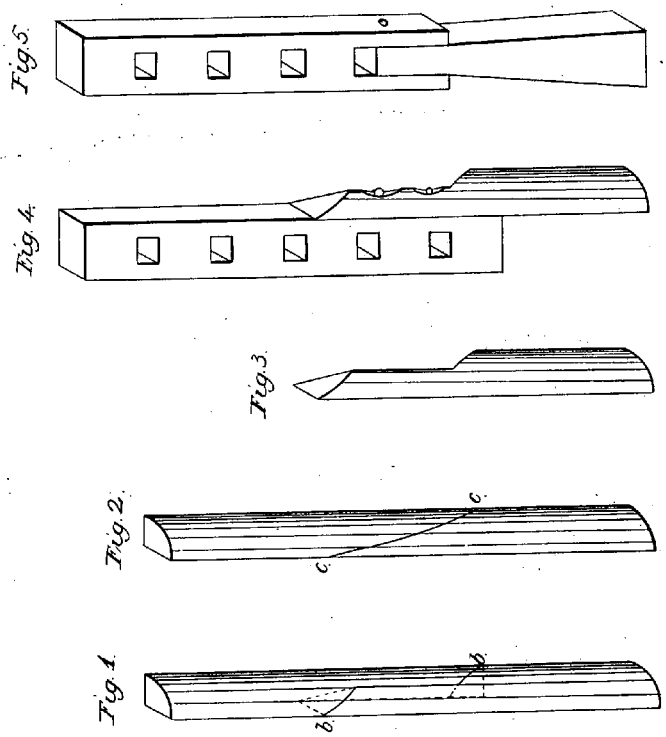
N. PETERS, PHOTO-LITHOGRAPHER, WASHINGTON, D. C.